United States Patent [19]
Fukuyoshi

[11] Patent Number: 4,853,296
[45] Date of Patent: Aug. 1, 1989

[54] ELECTRODE PLATE FOR COLOR DISPLAY DEVICE

[75] Inventor: Kenzo Fukuyoshi, Niiza, Japan

[73] Assignee: Toppan Printing Co., Ltd., Tokyo, Japan

[21] Appl. No.: 110,869

[22] Filed: Oct. 21, 1987

[30] Foreign Application Priority Data

Oct. 22, 1986 [JP] Japan .................. 61-251478
Jan. 21, 1987 [JP] Japan .................. 62-12084
Feb. 10, 1987 [JP] Japan .................. 62-29376
Apr. 3, 1987 [JP] Japan .................. 62-82554
Apr. 30, 1987 [JP] Japan .................. 62-107163
Jul. 22, 1987 [JP] Japan .................. 62-183015
Sep. 22, 1987 [JP] Japan .................. 62-238493

[51] Int. Cl.$^4$ ............................................. G02F 1/13
[52] U.S. Cl. ...................... 428/623; 428/626; 428/630; 428/652; 428/667; 428/680; 428/1; 350/336; 350/339 F
[58] Field of Search ............. 428/621, 623, 626, 630, 428/633, 652, 660, 666, 667, 680, 1; 350/336, 339 F

[56] References Cited

FOREIGN PATENT DOCUMENTS 219064 4/1987 European Pat. Off. ............ 350/336
3504886 8/1986 Fed. Rep. of Germany ...... 350/336
61-43727 3/1986 Japan .

Primary Examiner—John P. Sheehan
Assistant Examiner—George Wyszomierski
Attorney, Agent, or Firm—Bacon & Thomas

[57] ABSTRACT

There is proposed an electrode plate for a color display device such as a liquid crystal display device, which comprises a transparent substrate, a color filter disposed on the substrate, a transparent electrode formed on the color filter, and a metal conductor containing nickel and formed on the transparent electrode. The metal conductor may be a multi-layer structure wherein one of the layers is a nickel or a nickel alloy layer.

23 Claims, 5 Drawing Sheets

ELECTRODE PLATE FOR COLOR DISPLAY DEVICE

BACKGROUND OF THE INVENTION

1. Field of the Invention

This invention relates to an electrode plate for use in a display device provided with electrodes, for example, a liquid crystal display device. More specifically, the invention relates to an electrode plate for a color display device, which has a color filter made of an organic resin and colored by dyestuff or pigments, in which transparent electrodes and a metal conductor are formed over the color filter.

2. Description of the Prior Art

In recent times, there has been a trend toward increasing the screen size and the pixel density of liquid crystal displays. For this reason, the pitches of pixel arrangement and terminal sections are becoming finer; for example, as fine as 100 to 300 $\mu$m. This trend has been accompanied by efforts to reduce the thickness of the displays. At the same time, however, difficulties have been encountered in the connecting of the display to the drive circuit therefor. For this reason, what is commonly termed as the chip-on-glass (COG) method has come into use, in which a display drive IC is directly mounted on the base plate (i.e., a glass plate usually 1 mm in thickness) of the liquid crystal display, as well as an alternative method in which a soldering is used for the connection to improve the reliability.

Even with a prior art display device, a black matrix is sometimes provided on the base plate. In this case, a black matrix formed with a coating of pigments or dyes to a thickness of as little as 1 $\mu$m, which is required for a color filter, is not sufficient for obtaining a satisfactory light-blocking performance, with the result that the pixel aperture factor cannot be reduced.

It may be conceivable to form a black matrix with a metal layer. In this case, a sufficient light-blocking performance may be obtained. However, electric short circuit between a metallic chromium thin film and a transparent electrode formed on color filter is liable to be caused through defects in a color filter layer. Therefore, the employment of a metallic layer as a black matrix is infeasible for electrode plate of a simple matrix type liquid crystal display device. Further, such a layer does not act as a conductor. A chromium film formed by sputtering is conceivable as a metallic thin film. This film, however, offers resistance higher by one or more digit places than the resistance of bulk, thus hindering the performance thereof.

Further, where color filters are provided after the deposition of a metal conductor, the metal conductor is attacked when patterning the color filters and transparent electrodes. This often results in degradation of the quality of the metal conductor. This means that bonding failure due to contamination of the metal conductor surface may be frequently occurred at the time of soldering or bonding at terminal sections. Further, the manufactures of both of the metal conductor and transparent substrate are performed in vacuo, while the manufacture of the color filter is performed by printing. This means that it is necessary to conduct a sequence of the manufacturing operation first in vacuo, then in the atmospheric pressure and finally in an evacuated atmosphere. The printing operation and operations in vacuo can not be conducted in a continuous process because of differences in the working environments. Further, it is necessary to effect evacuation twice.

SUMMARY OF THE INVENTION

An object of the present invention is to provide an electrode plate for color display device, which is excellent in performance and can be efficiently manufactured.

Accordingly, the present invention provides an electrode plate for a color display device, which comprises a transparent substrate, a color filter formed on the substrate, a transparent electrode formed on the color filter, and a metal conductor formed on the transparent electrode and at least partly containing nickel.

DETAILED DESCRIPTION OF THE PREFERRED EMBODIMENTS

Figure 1:
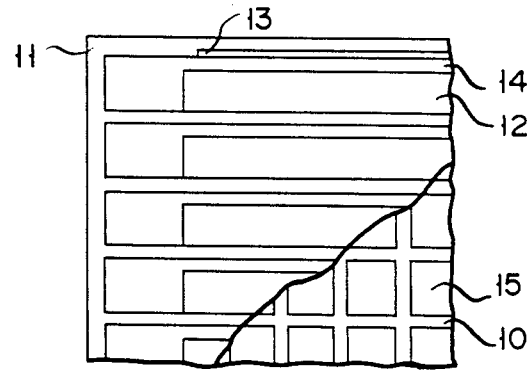
FIG. 1 is a schematic plan view showing one embodiment of the present invention.

The electrode plate for a color display device according to this invention, as noted above, is one, in which color filters, transparent electrodes and a metal conductor at least partly containing nickel are piled up in the mentioned order on a transparent substrate. As a variation of this structure, it is possible to adopt a structure, in which the metal conductor consists of a single nickel layer. Further, it is possible to adopt a structure, in which the metal conductor consists of a plurality of layers, one of which is a nickel layer. It is further possible to adopt a structure, in which the metal conductor consists of a nickel alloy. It is further possible to adopt a structure, in which the metal conductor consists of a plurality of layers, one of which consists of a nickel alloy.

Of the above structures of the metal conductor, the two-layer structure consisting of a layer of a member of a group consisting of chromium, molybdenum, tungsten and titanium and a nickel layer has an effect of promoting the adhesivity of nickel to the transparent electrodes.

The metal conductor may include in its structure a layer of a member of a group consisting of chromium, molybdenum, tungsten and titanium and a nickel alloy layer. This structure has an effect of promoting the adhesivity of nickel to the transparent electrodes.

Particularly, pronounced effects may be obtained in case where the metal conductor has a two-layer structure consisting of a chromium layer and a nickel layer.

Also, pronounced effects may be obtained in case where the metal conductor has a two-layer structure consisting of a chromium layer and a nickel alloy layer.

Further it is possible to adopt a three-layer structure of the metal conductor, which consists of a layer of a member of a group consisting of chromium, molybdenum, tungsten and titanium, a layer of a member of a group consisting of aluminum and aluminum alloys, and a layer of nickel or nickel alloys. In this structure, the layer of a member of the group consisting of aluminum and aluminum alloys has an effect of preventing mutual diffusion of tin at the time of soldering.

Further, it is possible to adopt a three-layer structure of the metal conductor, which consists of a layer of a member of a group consisting of chromium, molybdenum, tungsten, titanium and alloys of these elements, a layer of a group consisting of aluminum and aluminum alloys and a nickel alloy layer.

Again in this structure, the layer of a member of the group consisting of aluminum and aluminum alloys has an effect of preventing mutual diffusion of nickel and tin at the time of the soldering.

Particularly strong effects can be obtained in the case of a three-layer metal conductor consisting of chromium, aluminum and nickel layers.

Further, it is possible to use a metal conductor consisting of a nickel alloy containing 0.1 to 25% by weight of at least on member of a group consisting of aluminum, chromium, titanium, molybdenum, zirconium, magnesium, silicon, tantalum and tungsten. Since this structure consists of a single structure, it can be formed in a single step, and the adhesivity of the metal conductor is rather good.

Further, it is possible to use a nickel alloy containing 0.5 to 20% by weight of at least one member of a group consisting of tin, indium, lead, gold, silver, cadmium, palladium and copper. This nickel alloy structure has an effect of improving the soldering property.

The color filter here means an organic thin film which is colored by a dyeing or printing process.

The metal conductor is desirably a good electric conductor in order to reduce the electric resistance of the transparent electrodes.

Further, for effecting the soldering or bonding when mounting such an electrode plate, a metal conductor may be used, which is a coating of gold, aluminum, tin, copper, solder alloys, etc. For wire bonding, The top layer of the metal conductor may consist any one of aluminum, tin, gold, copper and alloys of these elements.

While wire bonding has been shown, it is also possible, in the case of gang bonding, whichever a film carrier called TAB or a flip chip is employed, to employ substantially the same material as mentioned above.

In the manufacture of the transparent electrodes, a conductive film consisting of an oxide of indium and tin called ITO, an oxide of tin, a mixture oxide of tin and antimony, a mixture oxide of zinc and aluminum and these metal oxides is patterned by means of etching.

The overcoat layer has less pin hole defects if it is an organic thin film, while it has good relative humidity resistance if it is an inorganic thin film. In order to obtain both the effects, the two layers may be combined.

The overcoat layer may be formed by using inorganic oxide such as silicon dioxide, aluminum oxide, magnesium oxide and titanium oxide and also various resins such as acrylic resins used as color filter material, peptide resins such as gelatine, glue and casein, an acrylic resins such as JDS, JMC (both being trade names by Nippon Gosei Gomu), epoxy resin, polyimide resin, polyamide resin and polyetheramide resin.

Further, where the overcoat layer has a two-layer structure consisting of an organic thin film of a member of a group consisting of gelatine, low molecular weight gelatine, glue and casein and an inorganic thin film of a member of a group consisting of silicon oxide, magnesium oxide, aluminum oxide and mixtures of these oxides, improved effects can be obtained. Further, the thickness of the inorganic thin film is most preferably in a range of 400 to 8000 angstroms.

Preferred materials of this film are silicon dioxide, magnesium oxide, aluminum oxide, zirconium oxide, tantalum pentoxide and other transparent oxides.

Where driver ICs are directly mounted on a liquid crystal panel, the metal conductor may more preferably include a nickel or nickel alloy layer.

Further, it is possible to provide an electromagnetic induction electrode for inputting data. To enable this, a separate conductor may be provided in addition to the transparent electrodes and metal conductor. In this case, it is possible to permit the electromagnetic induction electrode to be used for the black matrix. The electromagnetic induction electrode consists of transversal and longitudinal conductor lines. A point is indicated from above the electrode using a magnetic field generation cursor such as a coil. By so doing, current is excited in the electromagnetic induction electrode according to the field generated from the cursor. The position of the cursor is calculated by detecting the current.

Further, a black matrix is often used. The material in this case may be a patterned metal thin film or an organic filter. The organic filter has less pin hole defects, and the same material as that for color filters may be used for this purpose.

Further, the metallic thin film may generally be made of any material. The metallic thin film may be formed to serve also as an electromagnetic induction electrode or as a metal conductor.

Further, when the metal conductor has a comb-like shape, it serves the role of a black matrix. Besides, its width is equal to the space (between adjacent electrodes) width plus the allowance for the panel laminating. High contrast ratio for display can be obtained irrespective of the positional accuracy of color filters.

According to the invention, color filters, transparent electrodes and a metal conductor including at least nickel are formed in the mentioned order on a transparent substrate.

Thus, surface contamination of metal conductors when forming a lamination on the metal conductor or at the time of patterning is eliminated. For this reason, deterioration of the electric connection surface as in the case with prior art structures is eliminated, and the soldering or bonding process is facilitated.

Now, examples of the invention will be given.

EXAMPLE 1

Figure 2:
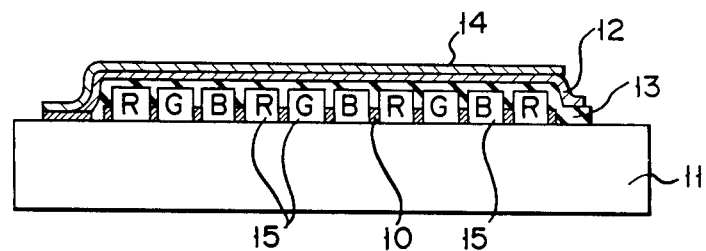
FIG. 2 is a schematic sectional view of that shown in FIG. 1.

FIG. 1 is a schematic plan view showing an example of the invention, and FIG. 2 is a schematic sectional view of the same example.

FIG. 1 shows an electrode for a display device, which comprises color filters 15, metal thin film 10 for patterning, insulating layer 13 as overcoat, transparent electrodes 12 consisting of indium oxide, tin oxide compound referred to as ITO and metal conductor 14 of nickel containing 0.5% of aluminum, these components being piled up in the mentioned order on transparent substrate 11 of glass having a thickness of 0.7 mm.

Metal thin film 14 for patterning is formed to a thickness of 4000 Å by vacuum deposition from a nickel alloy containing 2% by weight of aluminum as source of evaporation and subsequent etching for patterning. In this case, metal thin film 10 and metal conductor 14 serve the role of black matrix.

Color filters 15 are formed by using a process of relief dying. More specifically, a gelatine film is patterned, followed by dying to form three different color, i.e., green, red and yellow, patterns with a film thickness of 1.6 μm.

Transparent electrodes 12 are formed by forming ITO by ion plating to a thickness of 2,000 angstroms and with 20 Ω/cm$^2$, followed by patterning by the well-known photolithographic process.

The metal thin film for patterning is also used as lead lines called sense lines used for co-ordinate detection by an electromagnetic induction system. The transparent electrodes are used for the driving of liquid crystal called multiplexing. Further, as for the transparent electrodes and metal conductor, it is sometimes preferred to utilize a pattern which is divided into two divisions at the center.

EXAMPLE 2

Figure 3:
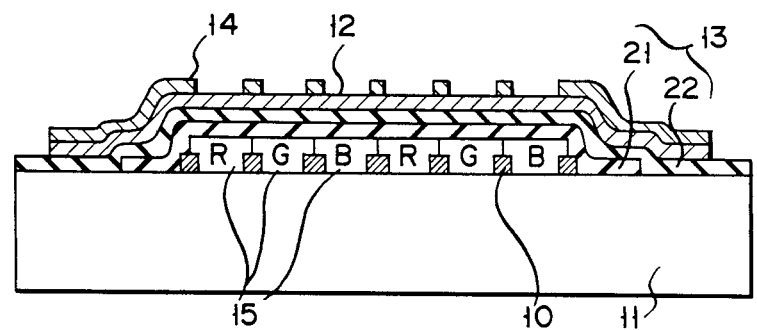
FIG. 3 is a schematic sectional view of another embodiment of the present invention.

FIG. 3 is a schematic sectional view showing this example. On transparent substrate 11 of glass are formed color filters 15, which are formed by patterning a gelatine film by the relief dying process, followed by dying to form four different color, i.e., green, red, blue and black, patterns with a film thickness of 1.5 μm. On color filters 15, organic thin film 21 is formed from the same gelatine film such that they have a thickness of 0.4 μm. On film 21 is formed inorganic thin film 22 of silicon oxide (SiO$_2$) with a film thickness of 2,000 angstroms. Films 21 and 22 serve together as insulating layer 13. Transparent electrodes 12 are formed by forming ITO by sputtering to a thickness of 1,600 angstroms and patterning ITO by the well-known photolithographic process. Metal conductor 14 is formed on transparent electrodes 12 of terminal section from directly attached film of a nickel alloy containing 1 wt % of molybdenum with a film thickness of 5,000 angstroms.

EXAMPLE 3

Figure 4:
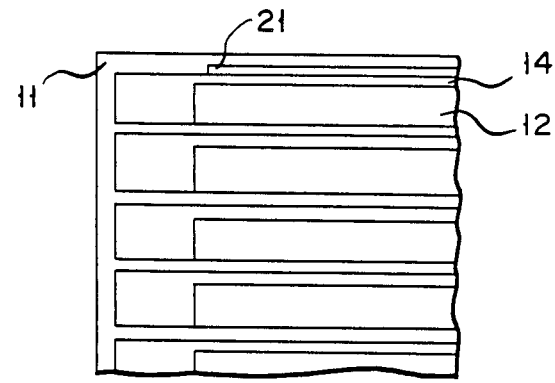
FIG. 4 is a plan view of another embodiment of the present invention.
Figure 5:
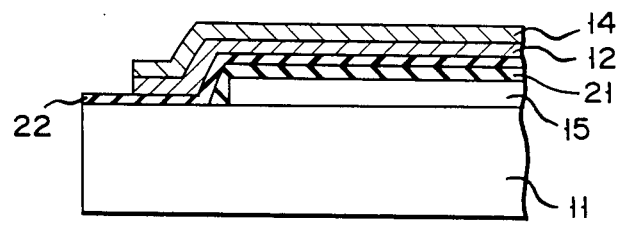
FIG. 5 is a schematic sectional view of the embodiment shown in FIG. 4.

FIG. 4 is a schematic plan view showing this example, and FIG. 5 is a schematic sectional view of the same. On transparent substrate 11 of glass having a thickness of 1 mm are formed color filters 15 by patterning a gelatine film by the relief dying process, followed by dyeing to obtain three different color, i.e., green, red and blue, patterns with a film thickness of 1.5 μm. Organic thin film 21 is formed on color filters 15 form the same gelatine film with a thickness of 0.6 μm.

Inorganic thin film 22 is then formed to a thickness of 2,000 angstroms over the entire surface of the substrate from silicon dioxide. Then, transparent electrodes 12 are formed by forming ITO by sputtering to a thickness of 1,600 angstroms and then patterning the film by the well-known photolithographic process. On transparent electrodes 12 is formed metal conductor 14 having a two-layer structure consisting of a chromium layer of 800 angstroms and a nickel layer of 3,000 angstroms. Metal conductor 14 is formed by vacuum deposition followed by patterning by the well-known photolithographic process.

EXAMPLE 4

Figure 6:
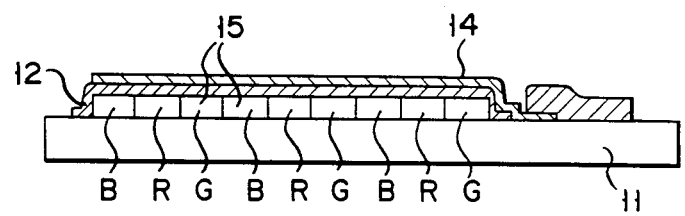
FIG. 6 is a schematic sectional view of a further embodiment of the present invention.

FIG. 6 is a schematic sectional view showing this example. On transparent substrate 11 of glass having a thickness of 1 mm are formed color filters 15 consisting of three different color, i.e., green, red and blue, patterns of an epoxy resin film with a thickness of about 2.5 μm. The color filters are formed by an off-set printing process. On color filters 15 are formed transparent electrodes 12 in the same manner as in Example 3 and with a film thickness of 1,600 angstroms. On transparent electrodes 12 is formed metal conductor 14 having a two-layer structure consisting of a chromium layer of 800 angstroms and a nickel layer of 3,000 angstroms. Metal conductor 14 is formed by using spattering and well-known photolithographic process.

EXAMPLE 5

Figure 7:
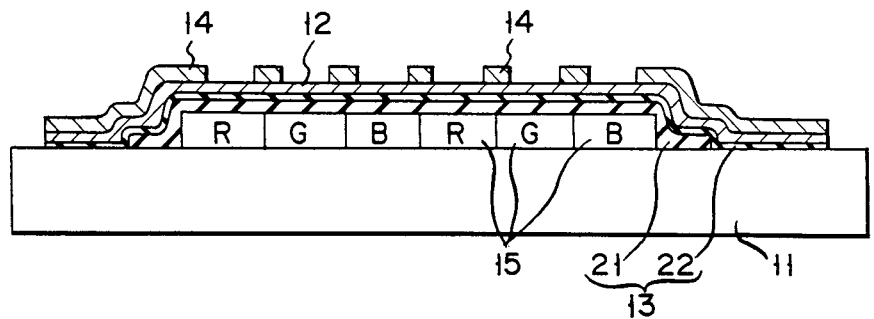
FIG. 7 is a schematic sectional view showing a liquid crystal display employing a different embodiment of the present invention.

FIG. 7 is a schematic sectional view showing a display device electrode plate of this example.

On transparent substrate 11 are formed by a well-known dying process color filters 15, which are organic filters with a film thickness of 1.5 μm. As overcoat layer, organic thin film 21 of gelatine with a thickness of 0.4 μm is then formed, and then inorganic thin film 22 of silicon dioxide with a thickness of 0.2 μm are formed, these films 21 and 22 constituting insulating layer 13. On film 13 are formed transparent electrodes 12 of ITO, which have a two-layer structure consisting of a chromium layer 600 angstroms thick and a nickel alloy layer 3,500 angstroms thick. The nickel alloy layer contains 6 wt % of copper, the rest being nickel. This layer is formed by sputtering. Inorganic film 22 is formed by sputtering. Metal conductor 14 is formed by the ordinary process using 15% solution of ammonium ceric nitrate (ammonium cerium (IV) nitrate). This permits ready etching of both the nickel alloy and chromium layers.

EXAMPLE 6

Figure 9:
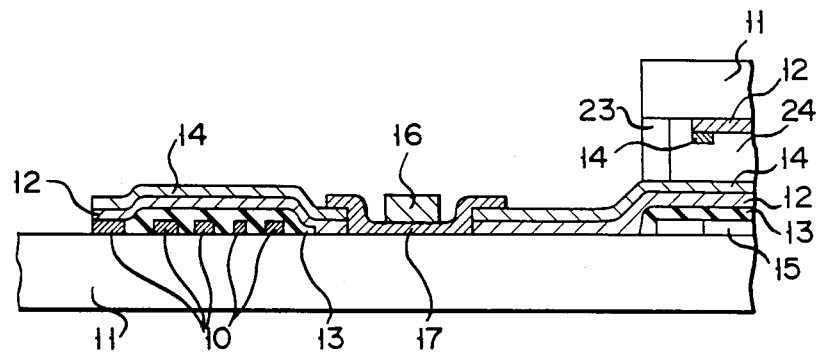
FIG. 9 is a sectional view showing the same liquid crystal display.
Figure 8:
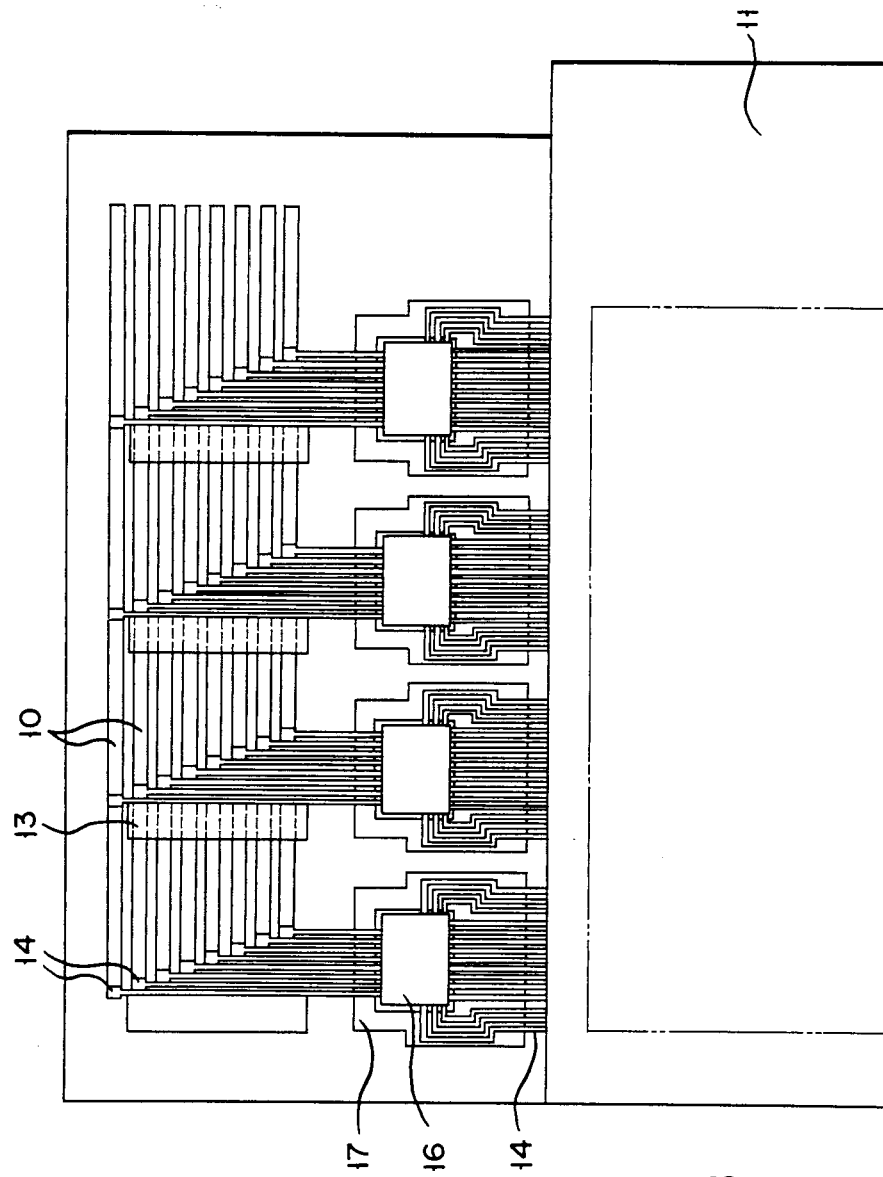
FIG. 8 is a schematic plan view showing a liquid crystal display employing a different embodiment of the present invention.

FIG. 8 is a schematic plan view showing a liquid crystal display using this example. FIG. 9 is a sectional view showing the same example.

Metal thin film 10 is provided on transparent substrate 11. It serves as common signal lines common to individual drive ICs 16, e.g., clock pulse input/output lines of a shift register, signal input lines for AC synchronization and bias power source lines for driving the liquid crystal display. Overcoat layer 13 is formed over metal thin film 10. It serves as an insulating layer. The common signal lines are in contact with the edge of the insulating layer, i.e., overcoat layer 13, which is oblique with respect to each signal line. The common signal lines are formed from metal thin film 10 consisting of 1,000 angstroms of chromium, 3,000 angstroms of nickel and 500 angstroms of gold. Overcoat layer 13 has a double-layer structure which is formed by laminating a inorganic thin film 2,000 angstroms thick consisting of silicon dioxide on an organic thin film consisting of 1.5 μm gelatine. Jamper lines have a double-layer structure consisting of transparent electrode 12 and metal conductor 14 laminated to a thickness of 2,000 angstroms. On these jamper lines there are provided solderings 17 with driver ICs 16. Liquid crystal 24 is sealed by sealing agent 23 at the opposite electrode plates such that opposed electrodes are perpendicular to one another.

EXAMPLE 7

Figure 10:
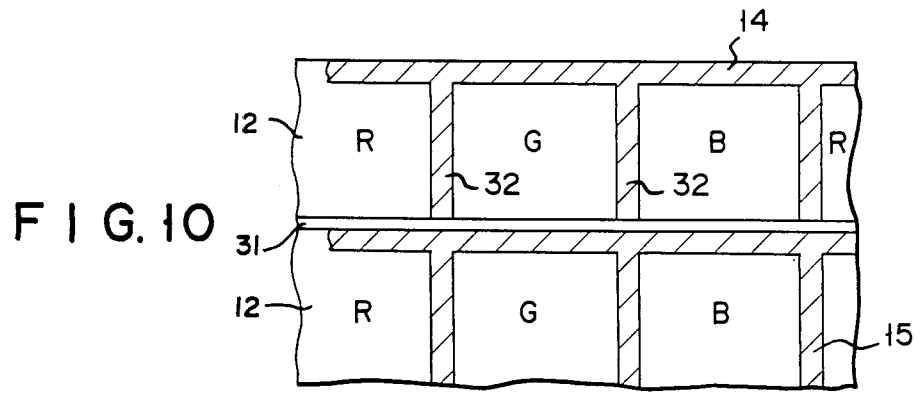
FIG. 10 is a fragmentary schematic sectional view showing an electrode plate for a different liquid crystal display according to the present invention.

FIG. 10 is a schematic fragmentary view showing an electrode plate for a liquid crystal display device according to the invention.

Figure 11:
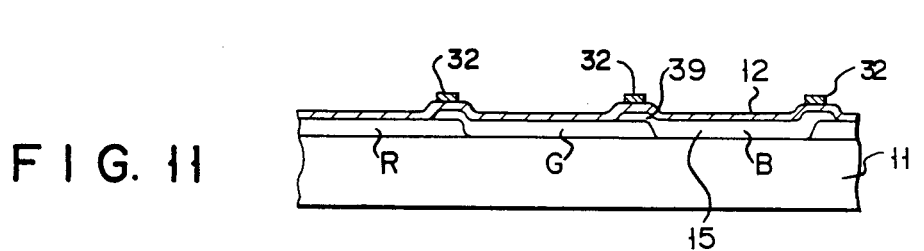
FIG. 11 is a schematic sectional view showing an electrode plate according to the present invention.

FIG. 11 is a schematic sectional view of the electrode plate. FIG. 10 is metal conductor 14 having comb portions 32. Metal conductor 14 is formed as shown in FIG. 11 on a transparent electrode 12 having a line width of 300 μm. Comb portions 32 have a width of 40 μm, i.e., 20 μm of space width 31 between adjacent transparent electrodes 12 plus approximately 20 μm as allowance of application of liquid crystal panels, i.e., allowance of the alignment of upper and lower electrode plates.

The thickness of transparent electrode 12 is 400 angstroms. Metal conductor 14 has a two-layer structure, which is formed by laminating a nickel layer 3,000 angstroms thick on a chromium layer 1,000 angstroms thick. FIG. 11 shows a structure, in which a red, a green and a blue color filters 15, transparent electrodes 12 and comb portions 32 are piled up on glass substrate 11 having a thickness of 1 mm. There is also formed an overlapped portion 39 beneath comb portions 32.

Figure 12:
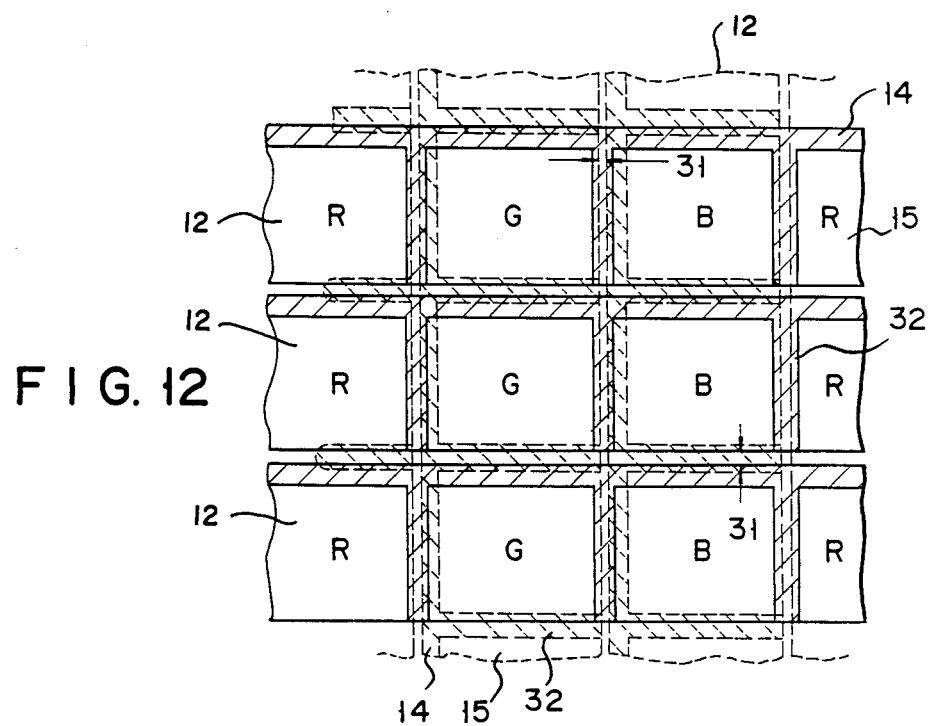
FIG. 12 is a fragmentary schematic view showing two electrode plates face-to-face laminated to each other in a different liquid crystal display device according to the present invention.

FIG. 12 is a fragmentary schematic view showing two electrode plates for a liquid crystal device according to the invention, these electrode plates being laminated together face-to-face. Color filters 15 are formed only on one substrate. In the other substrate, transparent electrodes 12 and metal conductors 14 having comb portions 32 are aligned such that they cross transparent electrodes 12 and metal conductors 14 with comb portions 32 on the aforesaid substrate. In this case, space 31 between adjacent transparent electrodes is covered by comb portion 32, indicating that there is substantially no leakage of light from the effective display portion. Therefore, even if there is slight positional deviation of two substrates 11, it is possible to provide high contrast liquid crystal panel with high yield because allowance for bonding is provided for comb portions 32.

The area resistance of the transparent electrode shown in this example was 100 Ω/cm², but with the formation of metal conductor the resistance of the transparent electrode was reduced to about 1/20 (i.e., 5 Ω/cm² in terms of the area resistance). The line width, resistance and other numerical values shown in this embodiment are by no means limitative.

EXAMPLE 8

Figure 13:
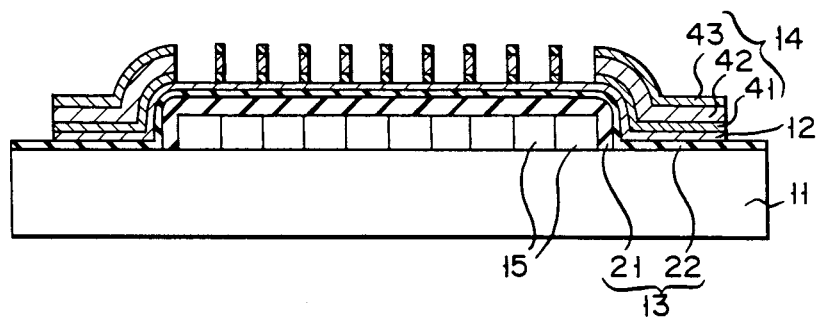
FIG. 13 is a schematic sectional view showing an electrode plate in a different liquid crystal display device according to the present invention.

FIG. 13 is a schematic sectional view showing this example of the electrode plate for a liquid crystal display device.

In this example, on transparent substrate 11 of glass are laminated a red, a green and a blue color filters 15, organic thin film 21, inorganic thin film 22, transparent electrodes 12 and metal conductor 14 in the mentioned order. Each of red, green blue color filters 15 consist of a gelatine layer 1.8 mm thick, which is formed by a dyeing process on transparent substrate 11. Organic thin film 21 consists of a gelatine film having a thickness of 0.8 mm. Inorganic thin film 22 is a silicon dioxide film with a thickness of 1,100 angstroms. Transparent electrodes 12 consist of an ITO film with a thickness of 600 angstroms. Further, metal conductor 14 has a three-layer structure consisting of adhesive metal layer 41 of chromium with a thickness of 500 angstroms, intermediate metal layer of aluminum with a thickness of 2,200 angstroms and top metal layer 43 of nickel with a thickness of 600 angstroms. Inorganic thin film 22, transparent electrodes 12 and metal conductor 14 are formed continuously using a sputtering device. For the patterning, the ordinary photolithographic process is used, and the individual layers are wet etched in the converse order to that of formation, i.e., from top metal layer 43.

According to the invention, the transparent electrodes and metal conductor may be formed continuously in vacuum using a series of vacuum devices. Further, since the metal conductor and transparent electrodes are contiguous to one another, they can be etched continuously. Since such similar operations are conducted continuously, the productivity can be improved. In the etching process the surface of the color filters may be protected if there is an overcoat layer.

Further, according to the invention the metal conductor is formed in the last step. Therefore, the contamination of the surface of metal conductor in color filter dying process and printing process is eliminated. Thus, it is possible to eliminate contact failure due to contamination of the metal conductor surface at the time of the soldering or bonding at the terminal section. For this reason, it is possible to obtain connection reliably and readily. Further, it is possible to realize surface mounting by soldering in a flip chip or film carrier system. Further, for the wiring in terminal sections or outside the effective display area, a metal conductor may be formed such as to cover the transparent electrodes entirely. It is thus possible to greatly reduce the electrode resistance.

Further, for wiring in terminal sections and outside the effective display area a metal thin film may be formed such as to cover the transparent electrodes entirely. Thus, it is possible to greatly reduce the electrode resistance.

Further, sometimes a metal thin film is formed such that transparent electrodes have comb portions. In this case, the resistance of the transparent electrodes is greatly reduced by the comb portions. This permits further improvement of the quality of the display, i.e., improvement of the response speed of liquid crystal drive voltage. Hence, it is possible to improve the rise speed and reduce the drive voltage.

Further, where the metal conductor and metal thin film for patterning are formed as in Example 1, the contrast can be improved greatly. Further, the same effects may be obtained where organic black stripes are used as in Example 2. Further, where two electrode plates with metal conductors having comb portions are provided face-to-face as in Example 7, more pronounced effects can be obtained.

What is claimed is:

1. An electrode plate for a color display device, comprising a transparent substrate, a color filter formed on said substrate, a transparent electrode formed on said color filter, and a metal conductor formed on said transparent electrode and at least partly containing nickel.

2. The electrode plate according to claim 1, wherein said metal conductor consists of nickel.

3. The electrode plate according to claim 1, wherein said metal conductor consists of a plurality of layers, one of said layers consisting of nickel.

4. The electrode plate according to claim 3, wherein said metal conductor is a two-layer structure, the material of one of said layers including a member of a group consisting of chromium, molybdenum, tungsten, and titanium, and the material of the other of said layers including nickel.

5. The electrode plate according to claim 4, wherein said metal conductor has a two-layer structure consisting of a chromium layer and a nickel layer.

6. The electrode plate according to claim 1, wherein said metal conductor consists of a nickel alloy.

7. The electrode plate according to claim 6, wherein said metal conductor consists of a nickel alloy containing 0.1 to 25% by weight of at least one member of a group consisting of aluminum, chromium, titanium, molybdenum, zirconium, magnesium, silicon, tantalum, and tungsten.

8. The electrode plate according to claim 1, wherein said metal conductor consists of a plurality of layers, on of said layers consisting of a nickel alloy.

9. The electrode plate according to claim 1, wherein said metal conductor is a two-layer structure, the material of one of said layers including a member of a group consisting of chromium, molybdenum, tungsten, and titanium, and the material of the other of said layers including a nickel alloy.

10. The electrode plate according to claim 9, wherein said metal conductor has a two-layer structure consisting of a chromium layer and a nickel alloy layer.

11. The electrode plate according to claim 1, wherein said metal conductor has a three-layer structure consisting of a layer of a member of a group consisting of chromium, molybdenum, tungsten, titanium, and alloys of these elements, a layer of a member of a group consisting of aluminum and aluminum alloys, and a nickel layer.

12. The electrode plate according to claim 11, wherein said metal conductor has a three-layer structure consisting of a chromium layer, an aluminum layer, and a nickel layer.

13. The electrode plate according to claim 1, further including an overcoat layer interposed between said color filter and said transparent electrode.

14. The electrode plate according to claim 13, wherein said overcoat layer between said color filter and said transparent electrode has a two-layer structure consisting of an organic material layer and an inorganic material layer.

15. The electrode plate according to claim 14, wherein said overcoat layer has a two-layer structure consisting of an organic thin film of a member of a group consisting of peptide resin and epoxy, polyimide, polyamide, and polyetheramide resins incorporating imide groups, and an inorganic thin film of a member of a group consisting of silicon oxide, magnesium oxide, aluminum oxide, and mixtures of these oxides.

16. The electrode plate according to claim 1, wherein terminal sections of said metal conductor are coated with a member of a group consisting of gold, aluminum, copper, tin, and solder alloys.

17. The electrode plate according to claim 1, wherein said metal conductor has a comb-like shape, and the width of the conductor of the comb-like portion is the width of the space between adjacent transparent electrodes plus an allowance for laminating of panels.

18. The electrode plate according to claim 1, further including a thin metal film for patterning interposed between said transparent substrate and said color filter.

19. The electrode plate according to claim 18, wherein said thin metal film for patterning is an electromagnetic induction electrode.

20. The electrode plate according to claim 18, wherein said thin metal film for patterning is a black matrix.

21. The electrode plate according to claim 1, wherein said metal conductor is led to a common signal line, and a portion where said metal conductor crosses said common signal line has a two-layer wiring construction.

22. The electrode plate according to claim 21, including an insulating layer between said metal conductor and said common signal line essentially consisting of the same material as said color filter.

23. The electrode plate according to claim 1, including organic filler interposed between said transparent substrate and said color filter.

* * * * *